E. C. LONG.
INTERNAL COMBUSTION MOTOR.
APPLICATION FILED AUG. 30, 1912.

1,146,630.

Patented July 13, 1915.

2 SHEETS—SHEET 1.

Attest:
A. G. Fletcher.
M. C. Hammon.

Inventor:
Elmer C. Long.
By Knight Bro.
attys.

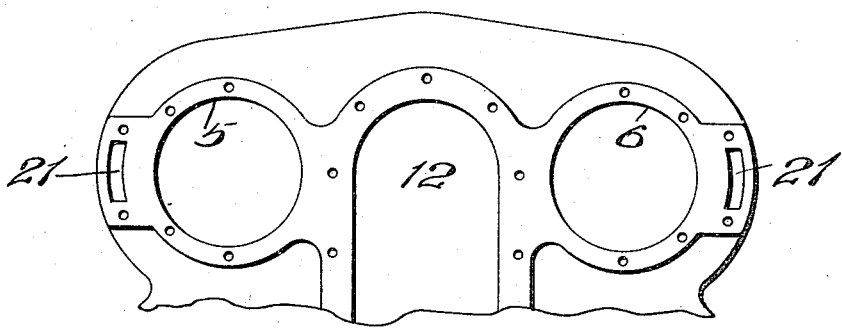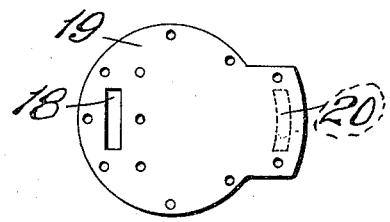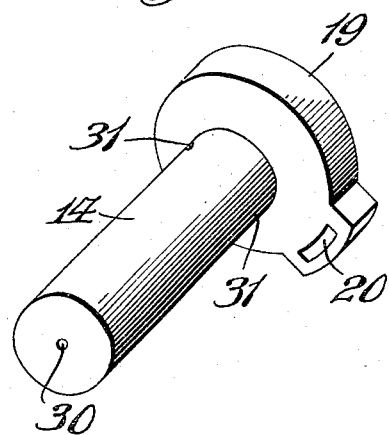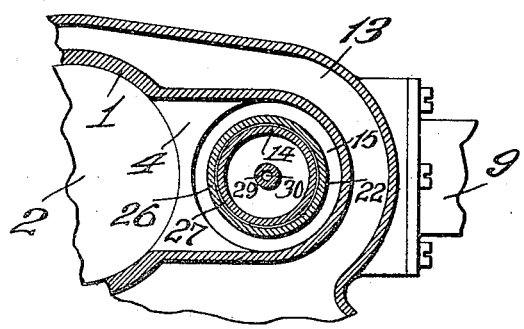

UNITED STATES PATENT OFFICE.

ELMER C. LONG, OF HANNIBAL, MISSOURI, ASSIGNOR TO THE LONG SILENT MOTOR COMPANY, OF HANNIBAL, MISSOURI, A CORPORATION OF MISSOURI.

INTERNAL-COMBUSTION MOTOR.

1,146,630.  Specification of Letters Patent.  Patented July 13, 1915.

Application filed August 30, 1912. Serial No. 717,829.

*To all whom it may concern:*

Be it known that I, ELMER C. LONG, a citizen of the United States of America, residing at Hannibal, in the county of Marion and State of Missouri, have invented certain new and useful Improvements in Internal-Combustion Motors, of which the following is a specification.

This improvement relates to internal combustion motors, and resides more especially in the valves of an internal combustion motor that is of tubular construction; and has for its primary object to provide means for keeping the valves cool.

Another object is to provide means whereby the valves, during their reciprocation, operate in an annular chamber, and in which the inner and outer walls of the chamber are surrounded by water.

A still further object is to locate water cylinders in the valve cylinders of an internal combustion motor, the tubular valves being reciprocably mounted over the water cylinders, thereby cooling them.

Figure 1:
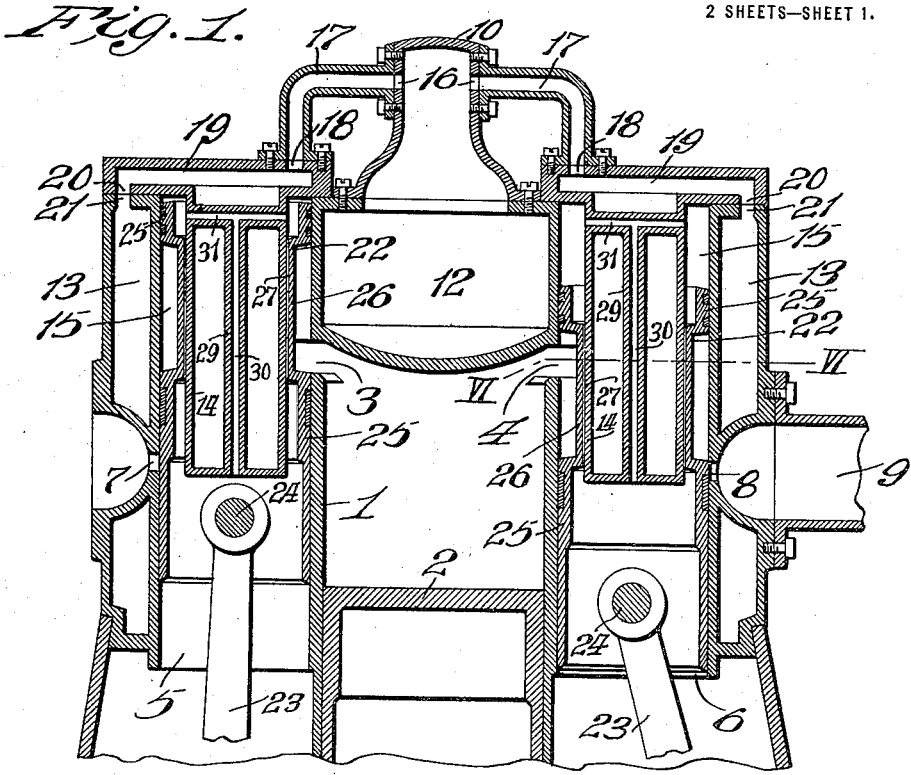
Figure 2:
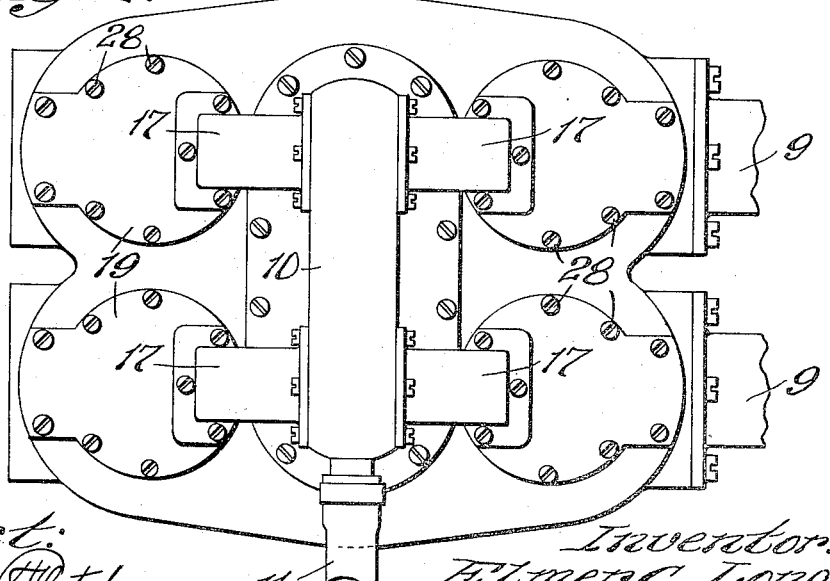

Other and further objects will appear in the specification and be specifically pointed out in the appended claims, reference being had to the accompanying drawings exemplifying the invention, and in which, Figure 1 is a vertical section of the upper portion of an internal combustion motor taken through the operating parts. Fig. 2 is a plan view of Fig. 1. Fig. 3 is a plan view of a portion of an internal combustion motor, showing one set of valve cylinders, the upper structure being removed. Fig. 4 is a perspective view of the improved water chamber which is used in cooling one of the valves. Fig. 5 is a plan view of Fig. 4. Fig. 6 is a horizontal section taken on the line VI—VI, Fig. 1.

Referring to the drawing, 1 designates the firing cylinder in which is reciprocably mounted the plunger 2. At the upper end of said cylinder are openings 3 and 4, said openings 3 and 4 communicating with inlet and exhaust cylinders 5 and 6, respectively. Located in the inlet cylinder 5 a little below the central portion of its length, is an inlet port 7 which communicates with an inlet pipe (not shown) that contains the gaseous mixture. Located in the exhaust cylinder 6, and at a point oppositely disposed from the inlet port 7, is an outlet port 8 communicating with the exhaust pipe 9.

As shown in Fig. 2, this type of engine is constructed of double cylinders and is water cooled. In order to provide the water jacket with water, a water-head 10 is mounted on top of the engine and has communication with the hose connection 11. The water-head 10 has an open bottom which connects with the water chamber 12 located above the cylinders 1. In order to get water around the valve cylinders 5 and 6, said cylinders are water jacketed, as shown at 13. Depending downwardly in the cylinders 5 and 6 are water cylinders or pockets 14, the outside diameter of said water cylinders being smaller than the inside diameter of the inlet and exhaust cylinders 5 and 6. By reason of the concentric alinement of the water cylinders with the inlet and exhaust cylinders, annular chambers 15 are formed. Water communication is made from the water-head 10 to the water cylinders 14 through the openings 16 in the water head, the branch pipes 17, and the openings 18 in the cylinder heads 19 of the water cylinders 14. Formed on the under sides of the water cylinder heads 19 are openings 20 through which water communication is made to the water jackets 13 through the openings 21. Reciprocably mounted in the annular chambers 15 are tubular valves 22 receiving their reciprocation from the connecting rods 23, mounted at 24 to said tubular valves. The tubular valves 22 have cylinder bearing end portions 25 and a reduced neck portion 26, said reduced neck portion being hollow, as shown at 27, so that the valves will be free to reciprocate along the water cooling cylinder 14. In the mounting of these water cylinders 14, after they are located in the inlet and exhaust cylinders 5 and 6, they are held in place by the cap screws 28. The reduced neck portions 26 of the tubular valves 22 allow for the intake of the gaseous mixture and the exhaust from the explosion to traverse their respective cylinders in reaching their respective port openings.

In the operation of an internal combustion motor having sliding valves, and referring to Fig. 1, it can be seen that when the explosion takes place, the valves are in the fire zone, and will become heated. In the construction shown, where the valve is of the sliding tubular type, this improved device of depending water cylinders extending down in the central portion of the valve, having water circulation that is common to all water cooled explosive motors, the valves will be kept comparatively cool. And, furthermore, with the water jackets 13 extending around the valve cylinders, the valves are cooled both inside and outside.

In order to further assist the cooling of the valves and valve cylinders and also to prevent resistance against the reciprocation of the valve 26, each of the water cylinders 14, has an integral central portion 29, which extends vertical through said water cylinders to a point adjacent the top thereof, then horizontally across to the walls of said cylinders. Formed in said portion 29, are the vertical and horizontal openings 30 and 31, said openings being in communication with the valve cylinders, in which said water cylinders is located.

It is readily seen that when the valves 26 move upwardly, air which is in the upper portion of the annular chambers 15 will not be compressed, forming resistance on the valve, but will readily pass through the openings 31 and 30, to the lower end of the cylinders 5 and 6, and when said valves 26 are moving downwardly the air will pass up through said openings. This displacement of the air from the upper end of the cylinders 5 and 6, and said air passing through the openings 30 and 31 of the water cylinders 14, will help the cooling of the valve cylinders and valves.

What I claim is:

1. A valve cylinder, a water cylinder extending into said valve cylinder, an air passageway formed in said water cylinder, a reciprocating hollow valve mounted in said valve cylinder, the hollow portion of said valve being mounted over said water cylinder.

2. A valve cylinder, a water cylinder of smaller diameter than said valve cylinder, an annular chamber formed between said valve cylinder and said water cylinder, a reciprocating hollow valve mounted in said annular chamber, said water cylinder forming means for cooling said valve and an air passageway formed through said water cylinder.

3. In an internal combustion motor, the combination of a firing chamber, valve chambers located adjacent said firing chamber, water jackets passing around said valve chambers, a water cylinder located in each of said valve chambers, an air passageway formed in each of said water cylinders, reciprocating hollow valves located in said valve chambers, the hollow portions of said valves being communicable with said water cylinders, the water jackets around said valve cylinders and the water cylinders located in said valve cylinders forming means for keeping said valves cool, said air passageways of said water cylinders forming means of communication between the ends of each of said valve chambers.

4. A valve cylinder, a water cylinder of smaller diameter than said valve cylinder, an annular chamber formed between said valve cylinder and said water cylinder, a reciprocating hollow valve mounted in said annular chamber, said water cylinder forming means for cooling said valve, and an air passageway formed through said water cylinder, said air passageway adapted to relieve end pressure from said valve.

ELMER C. LONG.

In the presence of—
  N. E. LONG,
  THOMAS M. O'HERN.

Copies of this patent may be obtained for five cents each, by addressing the "Commissioner of Patents, Washington, D. C."